C. KASPAR.
TROLLEY SUPPORTING MECHANISM.
APPLICATION FILED NOV. 1, 1915.
1,206,855.
Patented Dec. 5, 1916.
3 SHEETS—SHEET 1.
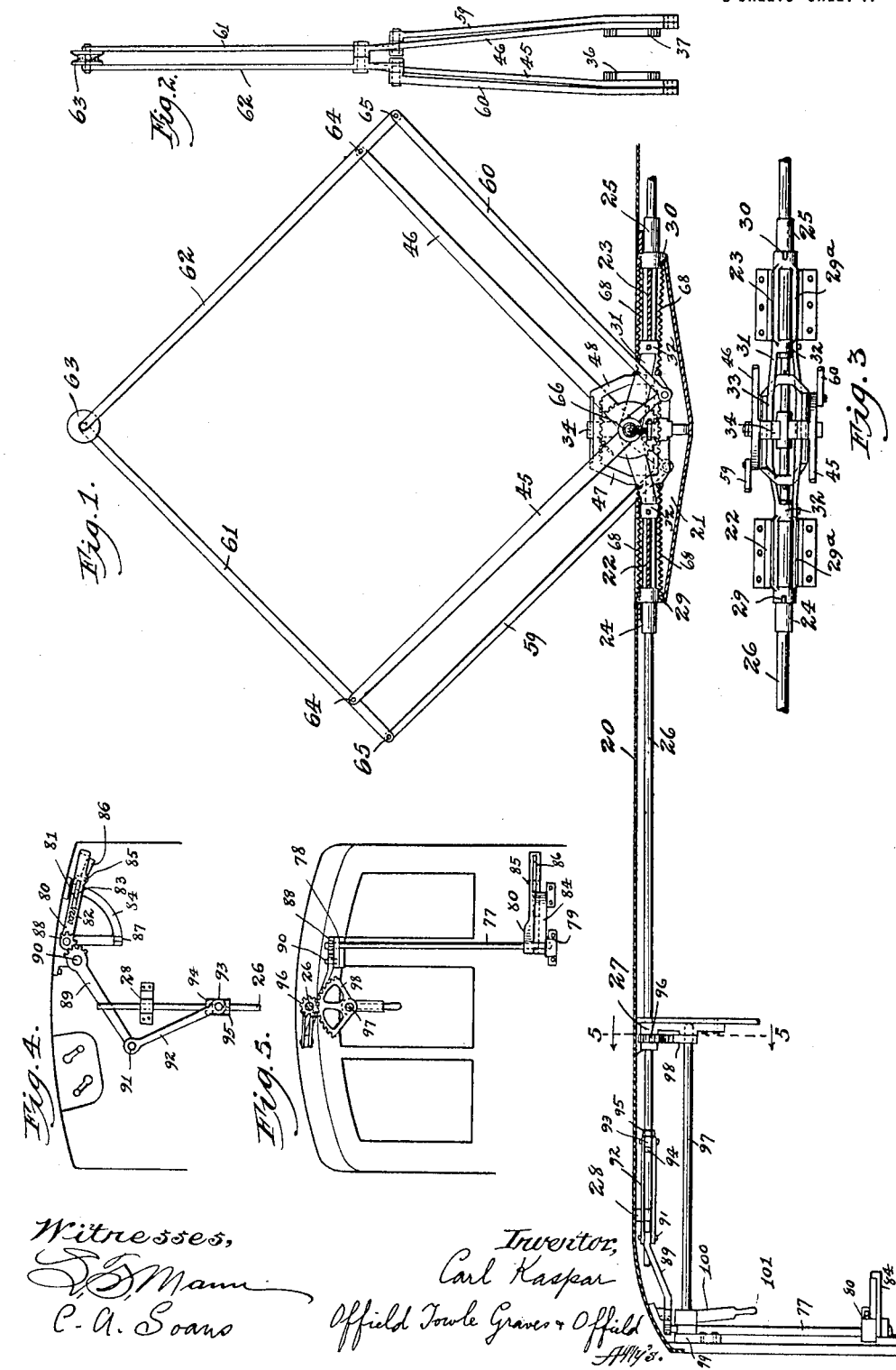

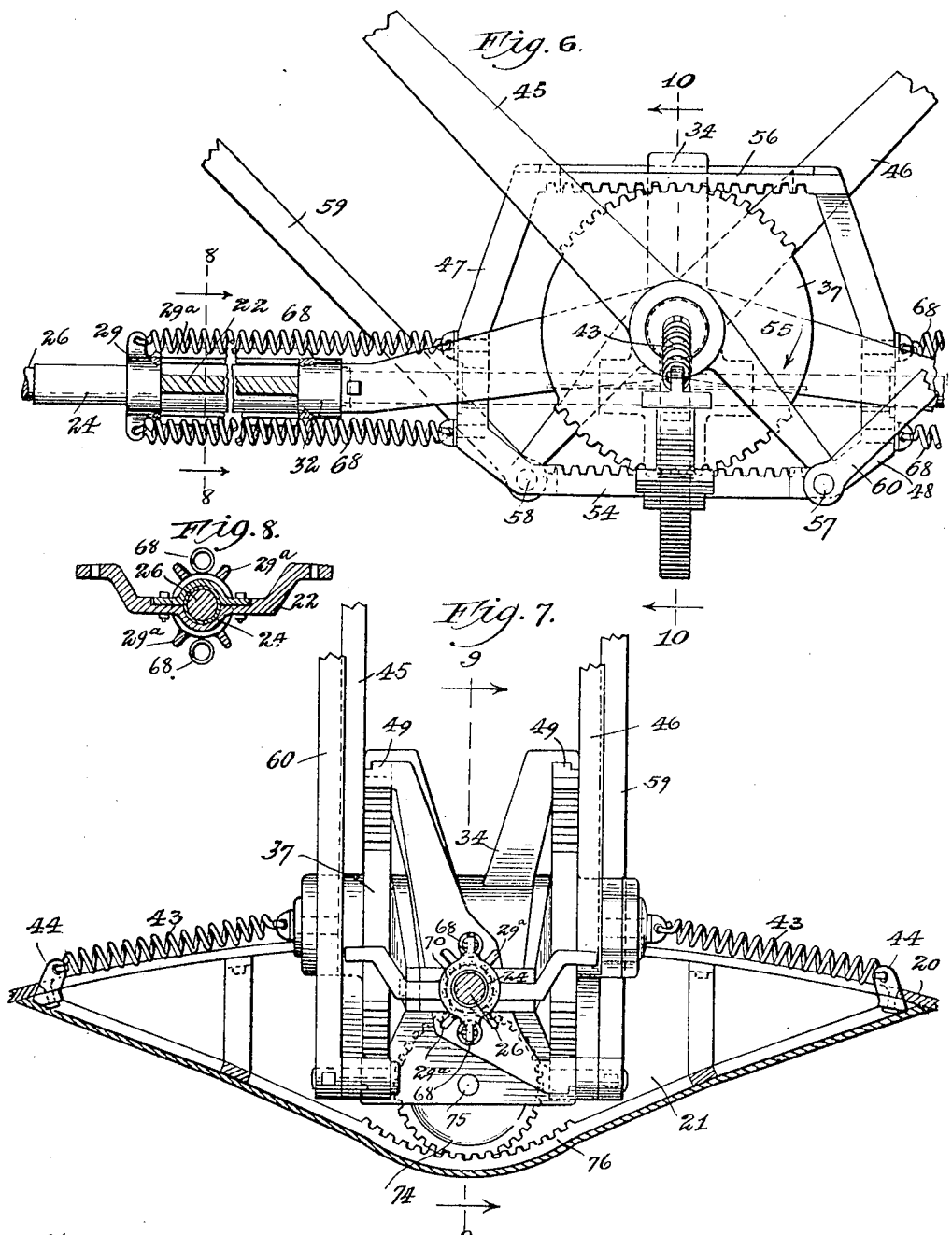

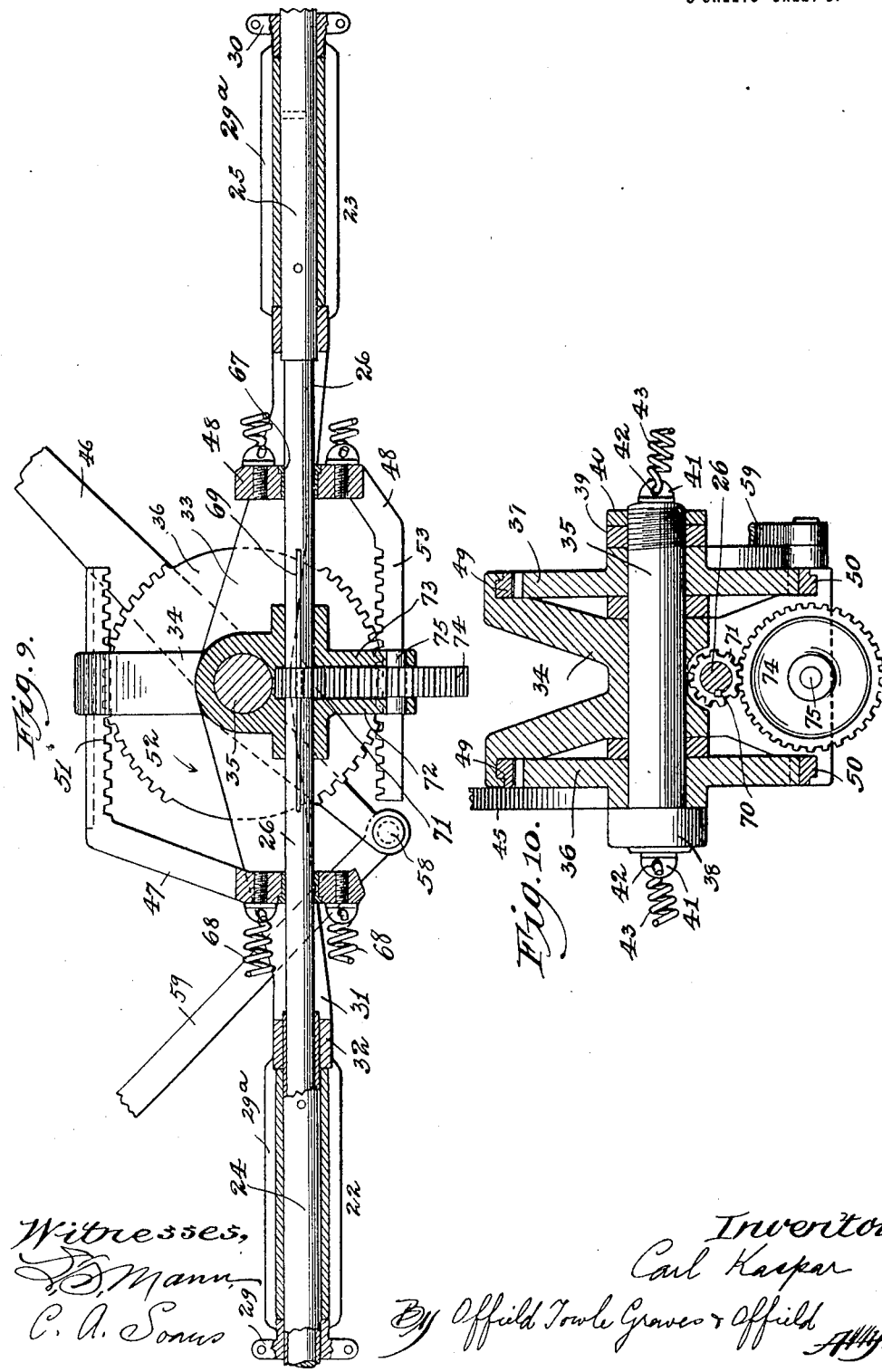

UNITED STATES PATENT OFFICE.

CARL KASPAR, OF CHICAGO, ILLINOIS.

TROLLEY-SUPPORTING MECHANISM.

1,206,855.  Specification of Letters Patent.  Patented Dec. 5, 1916.

Application filed November 1, 1915. Serial No. 58,966.

*To all whom it may concern:*

Be it known that I, CARL KASPAR, a subject of the Emperor of Austria-Hungary, residing at Chicago, in the county of Cook and State of Illinois, have invented certain new and useful Improvements in Trolley-Supporting Mechanism, of which the following is a specification.

My invention relates to improvements in means for supporting an electrical trolley in proper contactual relation with a trolley wire feeding cars or trains passing beneath.

Among the salient objects of my invention are, to provide a trolley supporting mechanism so organized that the motorman or conductor of the car or train may at will lower the trolley or withdraw it from contact with the trolley wire, without being compelled to place any part of his person outside of the car or train; to provide an improved trolley supporting device which can readily be adjusted in contact with the wire in case the wheel ever gets out of touch with the wire; to provide a construction in which sidewise as well as vertical movements of the trolley can be effected independently or contemporaneously, if desired; to provide an improved construction in which the possibility or danger of mechanical wear or lost motion affecting the mechanism is largely eliminated; to provide a construction which is practically indestructible and will last a life time with ordinary care, and will withstand a great amount of mechanical abuse; to provide a construction which may readily be applied to existing types of cars; to provide a construction embodying a comparatively small number of simple parts, easily inspected and maintained in repair; to provide a construction which is extremely rigid, substantial and efficient, while at the same time it may be manufactured comparatively cheaply by regular shop processes without the necessity of providing a large equipment of expensive tools or appliances; to provide a construction which can be operated by the trainmen with ease and rapidity, thereby reducing to the minimum the time consumed in adjusting the trolley; and, in general, to provide an improved trolley supporting mechanism of the type referred to.

In the drawings, Figure 1 is a longitudinal section of a trolley car equipped with my improved construction, showing the principal parts of the device in side elevation; Fig. 2 is an end view of the trolley arms and trolley, the operating mechanism therefor being not shown; Fig. 3 is a plan view of a portion of the trolley operating mechanism, the trolley arms having been broken away; Fig. 4 is a plan view of the left-hand end of Fig. 1, the roof of the car being shown cut away in order to disclose the operating mechanism; Fig. 5 is a section taken on the line 5—5 of Fig. 1; Fig. 6 is an enlargement of a portion of Fig. 1; Fig. 7 is an end view of Fig. 6; Fig. 8 is a section taken on the line 8—8 of Fig. 6; Fig. 9 is a section taken on the line 9—9 of Fig. 7, and Fig. 10 is a section taken on the line 10—10 of Fig. 6.

Referring to the drawings, 20 is the roof of the car, a central well or depression 21 being formed therein, as shown in Figs. 1 and 7. Secured to the roof of the car at the ends of said depression 21 are a pair of longitudinally extending brackets 22 and 23 which form axially alined bearings for a pair of sleeves 24 and 25 pinned to a shaft 26 extending longitudinally substantially the entire length of the car. Said shaft is also supported in a bearing 27 at each end of the car. Said sleeves 24 and 25 extend a substantial distance from either end of said bearing brackets 22 and 23 and slidably and rotatably accommodate at their outer ends a pair of winged collars 29 and 30. These winged collars 29 and 30 are connected by sets of four longitudinal ribs 29ª (see Fig. 8) with a skeleton member 31, the hubs 32 of which are also bored out to accommodate the sleeves 24 and 25. Said skeleton frame member 31 intermediate the bosses 32 comprises a pair of spaced apart arms 33 which diverge in the center in order to admit a central bracket 34. The bracket 34 and the arms 33 are bored out for a central pin or bolt 35, the outer ends of which beyond said frame arms 33 form journal mountings for a pair of trolley arm gears 36 and 37. Said bolt 35 has a head 38 at one end, the other end being threaded and equipped with lock nuts 39 and 40. The reduced portions 41 forming integral extensions of said bolt 35 are drilled out, as shown at 42, to receive the ends of a pair of coil springs 43, the other ends of which are attached to the roof of the car at either side of said central depression 21, as shown at 44.

The trolley arm gears 36 and 37 are substantially alike and are fixedly united to the inner sides of the lower ends of the main trolley arms 45 and 46. Said trolley arms 36 and 37 mesh with and are actuated by a pair of opposed U-shaped rack members 47 and 48, the upper and lower parts of which are staggered, as shown in Figs. 3, 7 and 9. These rack members 47 and 48 are maintained in operative relation with the gears 36 and 37 by means of the central casting 34 which is grooved out at the top, as shown at 49, and at the bottom, as shown at 50 in Fig. 10. The inclination or stagger of the rack members, the upper and lower rack bars of which engage different arm gears, causes the movements of the two rack bars to be exactly opposed to each other; that is to say, when the rack member 47 is drawn away from the center of the gear, the rack bar 51 will turn the gear 36 in the direction of the arrow 52, which will cause the lower rack bar 53 of the rack member 48 to move away from the center of the mechanism and in a direction opposite to the movement of the rack member 47. Similarly, while the rack bar 51 is rotating the gear 36 in the direction of the arrow 52, the rack bar 54 (see Fig. 6) is at the same time engaging the lower surface of the other gear 37 and rotating the same in the direction of the arrow 55. This causes the upper surface of said gear 37 to engage the upper rack bar 56 of the rack member 48 and move the same away from the center of the mechanism in a direction opposite to the movement of the rack member 47, and the same as the movement of the rack bar 53 also forming a part of the rack member 48.

The lower ends of the main trolley arms 45 and 46 are extended beyond the centers of the arm gears 36 and 37 and are pivotally connected at 57 and 58 to the lower ends of a pair of subsidiary steadying arms 59 and 60. The upper members of the parallel system are rods 61 and 62, the upper ends of which support a rotatable trolley wheel 63, the lower ends being pivotally connected at 64 and 65 to the upper outer ends of the lower trolley arms 45 and 46, 59 and 60. Corresponding arms of the system are of equal length, and the distance between the pivotal connections 64 and 65 on the one hand, and between the main pivotal centers 66 and the joints 58 and 57, respectively, are the same. The lower arms 45, 46, 59 and 60 are also of equal length between pivotal points.

It will be manifest that the parallel construction just described is extremely efficient for performing all the functions or duties required of it. On account of the distance between the pivotal points 64 and 65 and 66, 57 and 58, a comparatively large amount of wear or slackness of said pivotal connections does not interfere with the proper operation of the device, either while the trolley wheel is running along the wire or when the trainman is making an adjustment.

In order to raise or lower the trolley, the trainman, by means of mechanism to be described later, effects a longitudinal movement of the shaft 26 in either direction. When the end of one of the sleeves 24 or 25 strikes against the outer end of one of the bearing bushings 67 in one of the rack members 47 or 48, the rack member is moved toward the center of the mechanism and the gears 36 and 37 are rotated in a direction to cause the arm 46 to move in a clockwise direction, while the arm 45 is moved in an anticlockwise direction. The parallel system will consequently flatten out and the trolley wheel be correspondingly depressed. It should be noted that in the normal operation of the device, while the trolley wheel is making contact with the under surface of the trolley wire, the parallel system tends to extend or elongate in an upward direction under the influence of the springs 68, the inner ends of which are attached to the rack members 47 and 48, the outer ends thereof being connected to the winged collars 29 and 30. These springs tend to cause the rack members to separate from each other and effect rotary movement of the trolley arm gears 36 and 37 in the proper direction to elevate the trolley. The longitudinal movement of said control shaft 26, just described, provides for up-and-down adjustment of the trolley wheel. Sidewise or lateral movement of the trolley is effected by rotating the shaft in the brackets 22 and 23. Referring to Figs. 9 and 10, in the center of the middle casting 34 and beneath the center of rotary movement of the gears 36 and 37 is a longitudinal bore in which slides the shaft 26. Said shaft 26 is milled out to furnish a slot 69 in which slides a feather 70 for driving a pinion 71 seated centrally within a recess between the flat lugs 72 and 73 projecting downwardly from the casting 34. Said pinion 71 drives a gear 74 which is journaled between said lugs 72 and 73 on a pin 75. The lower periphery of said spur gear 74 is in driving engagement with an arcuate rack member 76 secured to the car roof at the bottom of the depression 21, the center of said arc being coincident with the center of the shaft 26. It is self-evident that when the shaft 26 is rotated, the gear 71 turns the large spur gear 75 which engages and travels along the arcuate rack bar 76, thus swinging the entire trolley-supporting mechanism around the center of the shaft 26. The bearing for said swinging movement is furnished by the ends of the sleeves 24 and 25 of the rotatable support and connected parts 29, 30 and 32, 32 of the skeleton member 33. The rotary movement of the shaft 26 is effected through connections which will be described later.

Describing the means for effecting longitudinal movement of the control rod 26,—at each end of the car (see Figs. 1, 4 and 5) I provide a vertical actuating shaft 77 rotatably supported in journal bearings 78 and 79. The lower end of the shaft 77 is fixedly secured in a handle 80. Said handle is normally locked in the position shown in Fig. 4 by means of a dog 81 which is thrust outwardly from the center of the shaft 77 by means of a coil compression spring 82, and engages a notch 83 in the upper face of a fixed segmental bar 84. In the outer end of said lever 80 there is pivotally mounted at 85 a bell crank grip member 86, the inner end of which engages and forces back the dog 81 when the end of the handle is grasped to rotate the shaft 77. In the position shown in Fig. 4, the trolley wheel is free to follow the trolley wire. When the lever is moved into such position that the dog 81 engages the notch 87, which is similar in character to notch 83, the shaft 77 is rotated and causes a gear 88 keyed to the upper end of said shaft to engage and rotate a toothed lever 89 journaled on a pin 90 mounted in a bracket secured to the car frame. The extended end of said toothed lever 89 is pivotally connected at 91 to a pair of links 92, the inner ends of which pivotally engage a sleeve 93 loosely journaled upon the shaft 26 between the fixed collars 94 and 95. It is apparent that movement of the handle 80 will thus effect longitudinal movement of the shaft 26 and cause the trolley wheel to be depressed by the train of mechanism previously described.

In order to effect rotation of the shaft 26 in order to move the trolley transversely by means of the mechanism previously described, I key to the shaft 26 at each end of the car a spur pinion 96 located in forks of the bracket 27. The lower end of said bracket 27 forms a bearing for the inner end of the longitiudinal shaft 97 upon which is keyed a segmental gear 98 which engages said pinion 96. The outer end of said shaft 97 is rotatably supported in a bracket 99 secured to the frame of the car and also carries securely keyed thereon a depending lever 100. In order to conserve space and prevent interference with the view of the motorman, while at the same time furnishing him enough leverage to operate shaft 97, I mount slidably within the hollow handle 100 a hand-piece 101 which can be drawn out of the hollow shank 100 a sufficient distance to provide the desired leverage. Any suitable means may be employed to retain said handle-piece 101 in its uppermost position in the part 100 during the time that the trolley wheel is operating normally. It is manifest that movement of the lever 100 will rotate the shaft 97 and the shaft 26 through the gears 98 and 96. This, by means of the mechanism previously described, will swing the trolley-supporting levers transversely across the line of travel of the car and enable the trainman to adjust or shift the trolley on the wire.

Although I have described what I consider to be a preferred embodiment of my invention, it should be understood that the details described herein may be varied considerably without losing the benefits or advantages of my improved device; hence, the specifically decribed mechanism should not be considered as essential to my invention, except in so far as specified in the appended claims.

I claim:

1. The combination of a car body, a trolley arm supporting member mounted on said car body to swing transversely about a longitudinal axis, a trolley arm mounted on said support, a spring for elevating said arm, a shaft extending longitudinally of the car from said support, and means connecting said support and said shaft for effecting a transverse swinging movement of said support and said arm around said longitudinal axis.

2. The combination of a car body, a trolley arm supporting member journaled on said car body so as to swing about a longitudinal axis, a trolley arm carried by said support, a spring normally tending to elevate said arm, a shaft substantially co-axial with and journaled in said support and extending therefrom, and means connecting said support and said shaft whereby rotary movement of said shaft will effect rotary movement of said support about its longitudinal axis.

3. The combination of a car body, a trolley arm supporting member journaled on said car body so as to swing about a longitudinal axis, a trolley arm carried by said support, a spring normally tending to elevate said arm, a shaft substantially co-axial with and journaled in said support and extending therefrom, and gearing connecting said support and said shaft whereby rotary movement of said shaft will effect rotary movement of said support about its longitudinal axis.

4. The combination with a car body, a trolley arm, a spring for elevating said arm, a support for said arm mounted to swing transversely about a longitudinal axis extending lengthwise of the car, and a shaft extending from said support and revoluble on its own axis to effect transverse swinging movements of said support about said longitudinal axis.

5. The combination of a car body, axially alined fore and aft journal bearings carried by said car body, a longitudinal frame journaled in said bearings, a trolley arm transversely pivoted on said frame, a spring tending to elevate said arm, and a shaft extending through said frame and said bearings to each end of the car body for effecting rotary movement of said frame for swinging the trolley arm transversely.

6. The combination of a car body, axially alined fore and aft journal bearings carried by said car body, a longitudinal frame journaled in said bearings, a trolley arm transversely pivoted on said frame, a spring tending to elevate said arm, a shaft extending through said frame and said bearings to each end of the car body for effecting rotary movement of said frame for swinging the trolley arm transversely, and reduction gearing connecting said shaft with said support.

7. The combination of a car body, a frame journaled to swing about a longitudinal axis, a trolley arm carried by said frame, a spring for elevating said trolley arm, a fixed toothed member, a gear carried by said frame engaging said toothed member for rotating said frame, and a shaft journaled co-axially in said frame for actuating said gear.

8. The combination of a car body, axially alined fore and aft journal bearings carried by said car body, a longitudinal frame journaled in said bearings, a trolley arm transversely pivoted on said frame, a spring tending to elevate said arm, a shaft extending through said frame and said bearings to each end of the car body for effecting rotary movement of said frame for swinging the trolley arm transversely, a gear actuated by said shaft and eccentrically mounted on said frame, and a fixed transversely disposed toothed member actuated by said gear.

9. The combination of a car body, a trolley arm mounted on said car body, a spring for elevating said arm, a shaft extending from the vicinity of the trolley arm, and means for connecting the trolley arm with said shaft for depressing the arm by a longitudinal movement of the shaft, said connecting means having lost motion whereby said shaft normally does not interfere with the free spring-impelled movement of the arm.

10. The combination of a car body, a trolley arm carried by the car body, a spring normally tending to elevate said arm, a shaft extending from the vicinity of the trolley arm to one end of the car body, and coöperating engaging means carried by said shaft and arm for depressing said arm by longitudinal movement of said shaft.

11. The combination of a car body, a trolley arm carried by the car body, a spring normally tending to elevate said arm, a shaft extending from the vicinity of the trolley arm to one end of the car body, and coöperating engaging means carried by said shaft and arm for depressing said arm by longitudinal movement of said shaft, said means having lost motion permitting the normal spring-urged movements of said arm.

12. The combination of a car body, a trolley arm transversely pivoted on said car body, a shaft extending from the vicinity of said pivotal connection, gear teeth on said arm, and a toothed member adapted to be actuated by said shaft for depressing the trolley arm.

13. The combination of a car body, a trolley arm transversely pivoted on said car body, a shaft extending from the vicinity of said pivotal connection, gear teeth on said arm, and a toothed member adapted to be actuated by said shaft for depressing the trolley arm, said toothed member being normally operatively disengaged from said shaft to permit normal spring-urged movements of said arm.

14. The combination of a car body, a trolley arm transversely pivoted on said car body, a spring for elevating said arm, a gear carried by the lower end of said arm concentric with the pivot, a longitudinal rack member coöperating with said gear, and a shaft normally disengaged from said rack member for actuating the same to lower the trolley.

15. The combination of a car body, a frame carried by said car body adapted to swing on a longitudinal axis, a trolley arm transversely pivoted on said frame, a spring for elevating said arm, a shaft journaled co-axially with said frame, and coöperating engaging means associated with said shaft and said arm for lowering said arm.

16. The combination of a car body, a longitudinal frame longitudinally pivoted on said car body, a trolley arm transversely pvioted on said frame, a spring for elevating said arm, a shaft co-axially journaled in said frame, a gear on the lower end of said arm, and a rack bar engaging said gear and adapted to be actuated by said shaft.

17. The combination of a car body, a longitudinal frame longitudinally pivoted on said car body, a trolley arm transversely pivoted on said frame, a spring for elevating said arm, a shaft co-axially journaled in said frame, a gear on the lower end of said arm, and a rack bar engaging said gear and adapted to swing with said frame and to be actuated by said shaft.

18. The combination of a car body, a longitudinal frame longitudinally pivoted on said car body, a trolley arm transversely pivoted on said frame, a spring for elevating said arm, a shaft co-axially journaled in said frame, a gear on the lower end of said arm, and a rack bar engaging said gear and adapted to raise said arm and to be actuated by said shaft, said rack bar being journaled on said shaft but normally free to slide thereon under the influence of said spring-urged arm.

19. The combination of a car body, a trolley arm mounted on said car body, a shaft extending from the vicinity of the trolley arm, means connecting the trolley arm with said shaft for depressing the arm by a longitudinal movement of the shaft, and means for effecting a transverse movement of the upper end of said arm by a rotary movement of said shaft.

20. The combination of a car body, a supporting frame longitudinally pivoted on said car body, a trolley arm transversely pivoted on the frame, a shaft extending from said frame and arm, means connecting the trolley arm with said shaft for effecting a downward swinging movement of the arm by a longitudinal movement of said shaft, and means for effecting movement of said frame on its longitudinal axis by a rotary movement of said shaft.

21. The combination of a car body, a supporting frame longitudinally pivoted on said car body, a trolley arm transversely pivoted on the frame, a spring normally tending to elevate said arm, a shaft extending from said frame and arm, means connecting the trolley arm with said shaft for effecting a downward swinging movement of the arm by a longitudinal movement of said shaft, and means for effecting movement of said frame on its longitudinal axis by a rotary movement of said shaft, said longitudinally operated means being normally disengaged whereby free upward movements of the trolley arm under the influence of said spring are permitted.

22. The combination of a car body, a frame longitudinally pivoted on said car body, a trolley arm transversely pivoted on said frame, a shaft journaled co-axially with said frame, coöperating engaging means associated with said shaft and said arm for lowering said arm by a longitudinal movement of said shaft, and means for effecting a transverse swinging movement of said frame about its longitudinal axis by rotating said shaft.

23. The combination of a car body, a frame longitudinally pivoted on said car body, a trolley arm transversely pivoted on said frame, a spring for actuating said arm, a slidable shaft co-axially journaled in said frame, a gear on the lower end of said arm, a rack bar engaging said gear for raising said arm, and adapted to be actuated by said shaft, said rack bar being journaled co-axial with said shaft but capable of sliding movement in said frame under the influence of said spring-urged arm, and means for swinging said frame by rotating said shaft.

24. The combination of a car body, a frame longitudinally pivoted on said car body, a trolley arm transversely pivoted on said frame, a spring for actuating said arm, a slidable shaft co-axially journaled in said frame, a gear on the lower end of said arm, a rack bar engaging said gear for raising said arm and adapted to be actuated by said shaft, said rack bar being journaled co-axial with said shaft but capable of sliding movement in said frame under the influence of said spring-urged arm, means for swinging said frame by rotating said shaft, including a gear mounted on said frame, on an axis parallel with but spaced apart from the frame axis, a gear on said shaft for actuating said first gear, and a fixed circular rack bar concentric with the axis of said frame.

25. The combination of a car body, a pair of arms jointly supporting a contact device co-axially pivotally mounted on the car body and forming adjacent lower members of an extensible pantograph mechanism, a spring for raising said arms, a gear connected to the lower end of each of said arms, and a common rack member for actuating both of said gears whereby said gears are operated simultaneously in reverse direction and said arms are compelled to move in opposite directions at equal angular velocity.

26. The combination of a car body, a pair of arms jointly supporting a contact device, said arms being co-axially pivotally mounted on the car body, a spring for raising said arms, a spur gear co-axially mounted on the lower end of each of said arms, and a pair of rack bars secured together to move in unison located on opposite sides of the common axis and actuating said gears whereby said arms are compelled to move in opposite directions at equal angular velocity.

27. In a trolley supporting mechanism, a pantograph comprising a pair of upper arms jointly supporting a contact device and pivotally connected at their upper ends, a pair of lower arms pivotally mounted co-axially on said car body and pivotally connected at their upper ends to the lower ends of said upper arms, a lower extension on one of said upper arms, a lower extension on the lower arm parallel to the last named arm, and a link parallel with the other lower arm and pivotally connecting the ends of said extensions.

28. In a trolley supporting mechanism, a pantograph system comprising a pair of upper arms jointly supporting a contact device and having lower extensions, a pair of lower arms mounted co-axially and pivotally on the car body and having lower extensions extending beyond the pivot, said lower arms being pivotally connected at their upper ends to said upper arms above said extensions, and links parallel with said lower arms and pivotally connected to said extensions.

CARL KASPAR.

Copies of this patent may be obtained for five cents each, by addressing the "Commissioner of Patents Washington, D. C."